March 6, 1928. 1,661,757
L. A. JONES
MOBILE COLOR PROJECTOR
Filed Dec. 19, 1924 2 Sheets-Sheet 1
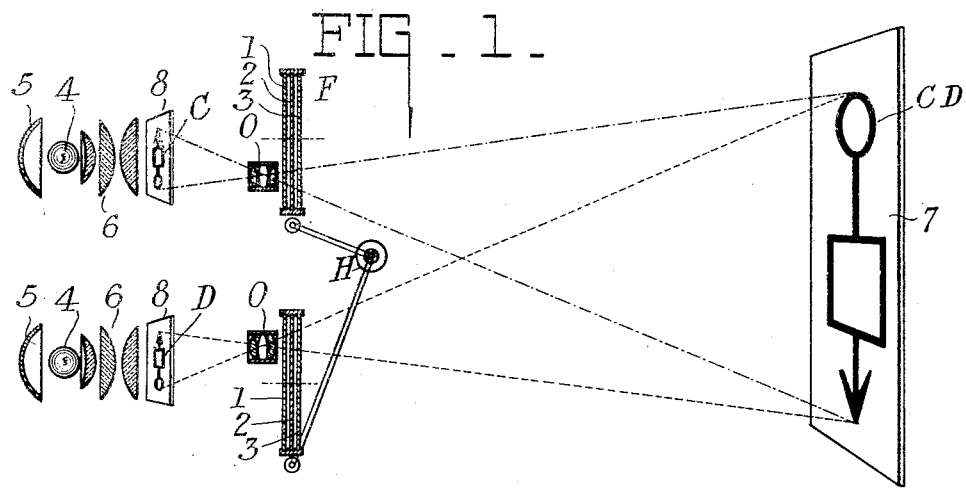
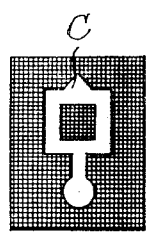
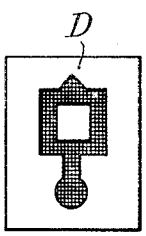
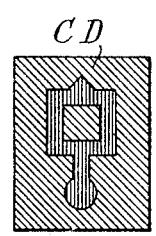
FIG.2. FIG.3. FIG.4.
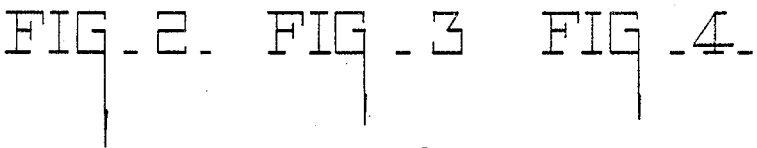
FIG.5.
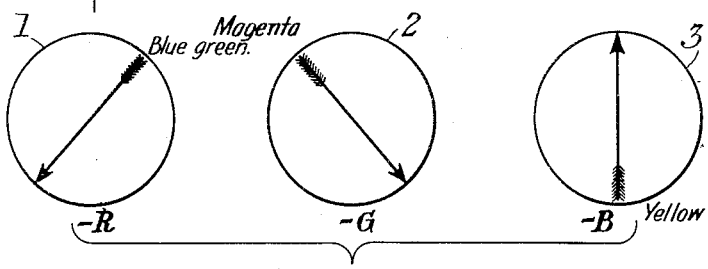
FIG.6.
INVENTOR,
Loyd A. Jones,
BY 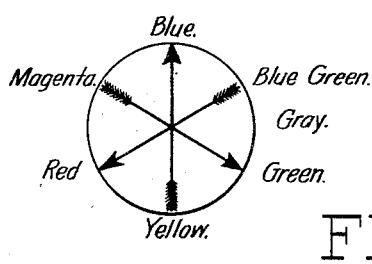
ATTORNEYS.

March 6, 1928.
L. A. JONES
MOBILE COLOR PROJECTOR
Filed Dec. 19, 1924
2 Sheets-Sheet 2
1,661,757
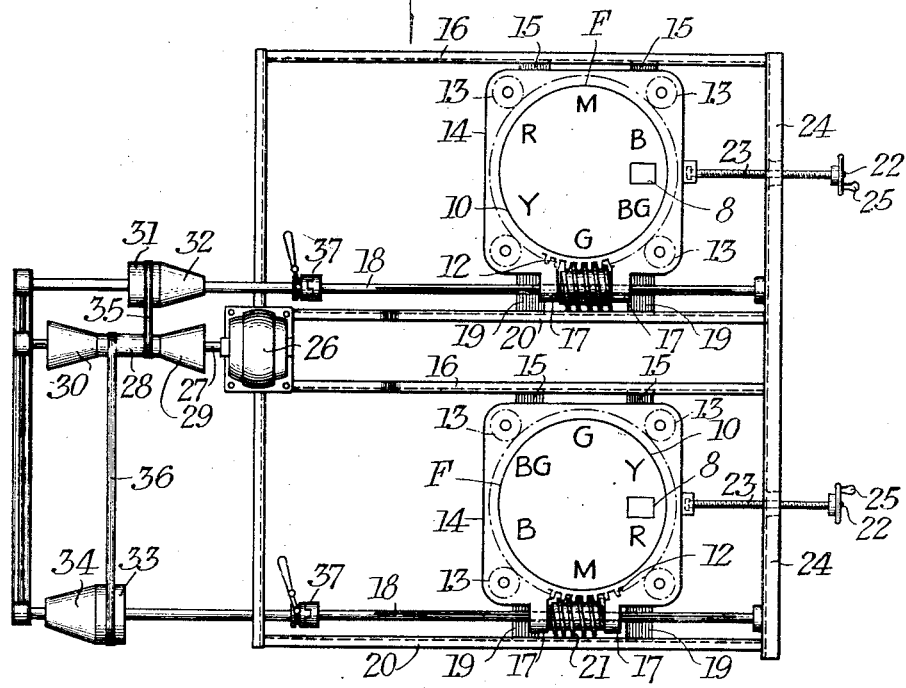
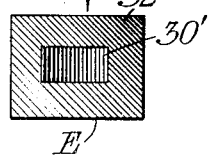
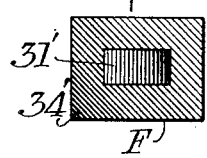
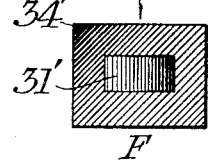
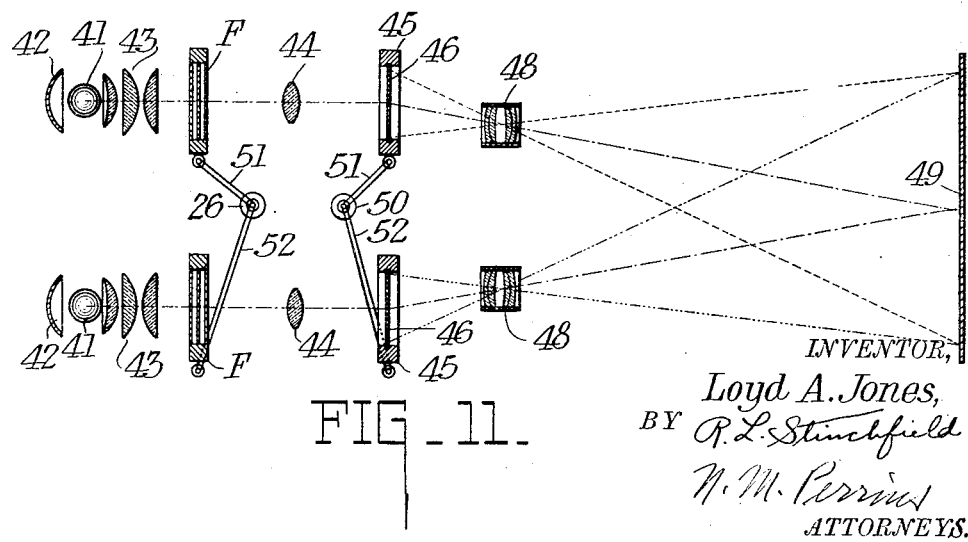
INVENTOR,
Loyd A. Jones,
BY
ATTORNEYS.

Patented Mar. 6, 1928.

1,661,757

UNITED STATES PATENT OFFICE.

LOYD A. JONES, OF ROCHESTER, NEW YORK, ASSIGNOR TO EASTMAN KODAK COMPANY, OF ROCHESTER, NEW YORK, A CORPORATION OF NEW YORK.

MOBILE COLOR PROJECTOR.

Application filed December 19, 1924. Serial No. 757,073.

This invention relates to an instrument for producing mobile color effects.

In particular it is my object to obtain designs of changing color by projecting differently colored beams of light through different designs upon a common screen. By changing the color of the beams and particularly by maintaining them of complementary but changing hue, and projecting them through related and preferably complementary designs, extremely varied, fantastic and beautiful effects may be obtained. These designs, which may be reproduced by a color motion picture process, can be projected for purposes of entertainment; as color settings for background and scenic effects for dramatic and motion picture productions, as backgrounds for titles used for motion pictures, advertising and announcement purposes, and in many other ways.

Reference will now be made to the accompanying drawings in which:

Fig. 1 is a diagram of a double optical system embodying my invention;

Figs. 2 and 3 show complementary designs that may be used in the two beams of the system;

Fig. 4 shows the designs of Figures 2 and 3 as projected in registration;

Fig. 5 shows the several components of my new combination filter;

Fig. 6 illustrates the effect of the three components when used together;

Fig. 7 shows the arrangements for controlling the filters in the two beams;

Figs. 8 and 9 show two complementary designs that may be used in the two beams;

Fig. 10 shows the design of Figure 9 turned over;

Fig. 11 is a diagram of another double optical system embodying my invention.

In Figure 1 are indicated diagrammatically two projecting systems each having a source of light 4, behind which is the usual reflector 5, a condenser system 6, which illuminates evenly the projection window 8, here shown as having the object C or D respectively, and the projection objective O which projects the image C or D on a spaced screen 7. The two systems are so adjusted that they project the complemental images in registration on the projection screen as indicated at CD. I have omitted the mechanical details of the projection system as a whole as my invention does not relate to them.

The designs C and D may be completely complemental line images as shown in Figures 2 and 3, that is each having an opaque portion corresponding to a transparent portion of the other. If two such designs were projected in registration by light of the same color and intensity, the design would be invisible. If they were projected by different colors, the resultant combined image would appear. If, for instance, image C were projected by red light and image D by green the resultant image CD would appear as in Figure 4, as a red figure on a green background.

In order to provide for any desired color rendering of designs I have provided novel color filters F. Each filter comprises a plurality of color wedge sheets with the direction of variation in color density preferably different in the several sheets. In my preferred form, three such sheets 1, 2 and 3, are used which are respectively minus—red, minus—green and minus—blue. That is, sheet 1 absorbs light only in the red portion of the spectrum; sheet 2 absorbs green light; and sheet 3 absorbs blue light.

These sheets are color wedges in which the light transmitting and absorbing characteristics are uniform as to quality but vary as to degree across the sheet. The filter sheet at the point indicated by the feather of the arrow in the several parts of Figure 5 is so dense that practically all of the red, green or blue light, respectively is absorbed, and varies in density toward the head of the arrow where it is practically transparent to all colors. Sheet 1 would therefore appear deep bluish green at the feather of the arrow and the color would gradually fade to nearly white at the head; sheet 2 would appear a deep magenta at one edge fading to nearly white across the sheet; and sheet 3 would appear deep yellow fading to nearly white. If these three sheets with the color wedges arranged in the directions as shown in Figure 5 are superposed, the resulting combination filter will appear as in Figure 6, forming a complete spectral cycle around the edge. Along any radius from the periphery to the center the color will gradually be de-graded until at the center it is gray. The combination filter will be of approximately uniform brilliancy throughout, if the several wedges are of equal density and vary uniformly from edge to edge, and will contain every hue in varying degrees of saturation.

The normal position of the two filters is such that complementary colors will be projected in the two beams and I have provided mechanism whereby they may be rotated before the beams simultaneously so that the changing colors will be always complementary. The mechanism is indicated, partly diagrammatically, in Figure 7, wherein are shown such structure as is necessary for an understanding of the relative interaction of the parts; but unnecessary mechanical details are omitted as they conceal rather than illustrate the real features of the invention. In Fig. 1 it is indicated as a whole as H.

Referring to Figure 7, a combination filter F of the character above described is mounted in line with each projection window 8. The filter F as a unit is mounted in an annular frame 10 with external gear teeth 12 around its entire periphery. These mesh with idle positioning pinions 13 carried on the plate 14, which is guided at one edge by lugs 15 sliding in the channel bar 16, and at the opposite edge by eyes 17 slidably engaging around shaft 18, and by lugs 19 sliding in channel bar 20. Slidably but non-rotatably mounted on shaft 18 is worm 21, engaging gear teeth 12. Plate 14 is adjustable as a whole by rod 22, the screen threads 23 of which engage in a threaded eye in support 24, and which may be turned by handle 25. It is obvious that by turning shaft 18 and handle 25 any desired area of the filter F can be brought to projection position in line with the corresponding gate 8.

The shafts 18 are driven from motor 26, which drives a shaft 27 on which is a long cylindrical pulley 28 with cone pulleys 29 and 30 at each end thereof. On upper shaft 18 opposite the pulley 28 is a cylindrical pulley 31 and opposite cone pulley 29 is a cone pulley 32. Similarly on lower shaft 18 are a cylindrical pulley 33 and a cone pulley 34. When the driving belts 35 and 36 are on the cylindrical pulleys the filters will be turned at the same speed. Clutches 37 permit the independent stoppage of either shaft 18.

When the two filters are rotated in the same direction, they will be positioned with the spectral cycle of colors arranged in the same direction but different in position by 180° in the two filters as indicated in Figure 7 by the letters denoting color on the filters. It is obvious that by means of a clutch, one beam may be made to project stationary color while the other projects mobile colors, while by use of the cone pulleys the filters may be given such differential speeds as to produce any desired changing effects.

I contemplate the use not only of line designs as shown but of half tone designs as well such as are shown in the complementary designs E and F. In E the central panel 30' is dense at the left and becomes transparent toward the right while the reverse is true of the central panel 31' of design F. The border 32' of design E is densest at the upper right hand corner and grades off diagonally across the design, the reverse being true of border 34' of design F. By turning design F upside down as in Figure 10, the panels are still complementary, but the borders are not. It is obvious that by selection of unsymmetrical and non-complementary designs and by selection of colors, an extremely wide variety of fantastic, weird, and beautiful stationary and mobile color effects may be obtained. It is obvious that the number of wedges used may be varied as well as their relative angles one to another thus varying the hue, brightness and saturation of the colors.

The filter may be so proportioned and positioned as to be axial of the beam. Such an arrangement is shown in Figure 11, where in each beam there is a light 41, reflector 42, and condenser 43. The filters F are placed in evenly illuminated planes near the condensers and the light projected therefrom by lenses 44 to the windows 45, where the designs 46 are positioned. The combined color and form designs are projected by objectives 48 in registration on the screen 49. There are diagrammatically indicated in connection with both the filters F and designs 46, motors 26 and 50, and driving connections 51 and 52, for driving the filters and the designs. Since the details of these are similar to those shown in Figure 7 a further description is unnecessary.

Each of the projected beams alone would throw on the screen 49 a color disc such as is shown in Figure 6, and if the two filters were arranged with 180° difference in the color positions the effect would be a white disc. If two designs such as C and D were projected the adjacent portions of the design projected by the two beams would be in complementary colors.

As noted above the drawings are largely diagrammatic. They are not even approximately drawn to scale and Figs. 1 and 11 are much foreshortened.

The structures here described are by way of example and numerous embodiments of my invention are possible. I contemplate as within the scope of my invention all such modifications and equivalents as fall within the appended claims.

Having thus described my invention, what I claim as new and desire to secure by Letters Patent is:

1. A structure for transmitting light rays differentially and comprising a series of at least three filters arranged in registration for light rays to pass through the entire area of each of them successively, each filter being predominately absorptive of light rays of definite wave lengths, over its entire area, and the absorptive characteristics of the several filters being different, and each filter varying uniformly across its area as to the amount of light absorbed, the directions of variation in the several filters being at angles one to another less than 180°.

2. A structure for transmitting light rays differentially and comprising a series of at least three filters arranged in registration for light rays to pass through them successively, each filter being over its entire area predominately absorptive of light rays of the same definite wave lengths different from the wave lengths predominately absorbed by the other filters, and each filter varying uniformly across its area as to the amount of light absorbed, the directions of variation in the several filters being at angles one to another less than 180°.

3. A structure for transmitting light rays differentially and comprising three parallel sheets, the sheets being respectively absorptive predominately of blue light, green light and red light, and each sheet varying uniformly across its area as to the amount of light absorbed the direction of variation in each sheet being at an angle of substantially 120° to the direction of variation in each of the other sheets.

4. The method of producing mobile color effects that comprises projecting two images by two beams of light upon a common screen area, interposing in the beams filters that vary in their light transmitting properties over their areas, and each of which has a range of color transmitting properties complementary to that of the other, moving the filters simultaneously so that colors transmitted by the two beams are always complementary.

5. In apparatus of the character described, two projection systems, each including a window and means for projecting images at said window in registration on a common screen area, elements at the windows having images complementary as to light and shade, filter means in each system comprising an annular series of different color-absorptive areas merging one into another, and interconnected means for continuously revolving said filter means and thus gradually and continuously changing the colors of the projected images.

6. In apparatus of the character described, two projection windows, images complementary as to light and shade at the windows, optical means for projecting said images in registration upon a common screen area, a light filtering means for each window through which passes the light by which the image at that window is projected on the screen, each light filtering means comprising a series of different color areas merging one into another and means for simultaneously and continuously adjusting each light filtering means to vary continuously the color of both projected images.

Signed at Rochester, New York, this 15th day of December, 1924.

LOYD A. JONES.